June 25, 1963 J. S. BAER 3,095,141

DATA HANDLING MECHANISM

Filed May 3, 1962 5 Sheets-Sheet 1

INVENTOR.
John S. Baer
BY
Roberts, Cushman & Grover
ATT'YS

June 25, 1963 J. S. BAER 3,095,141

DATA HANDLING MECHANISM

Filed May 3, 1962 5 Sheets-Sheet 2

DATA HANDLING MECHANISM

Filed May 3, 1962 5 Sheets-Sheet 3

United States Patent Office 3,095,141
Patented June 25, 1963

3,095,141
DATA HANDLING MECHANISM
John S. Baer, Medford Township, Burlington County, N.J., assignor to Dennison Manufacturing Company, Framingham, Mass., a corporation of Massachusetts
Filed May 3, 1962, Ser. No. 192,134
5 Claims. (Cl. 234—45)

This invention relates to mechanism for transferring data and assembling data and particularly relates to transferring data that appears in punched form in tickets, cards and the like, and assembling other data with this transferred data.

Devices for reading punched data conventionally operate on the principle of sensing the punched holes by means of sensing pins that penetrate the holes, and, as a result of such penetration, a record or indication, permanent or transient, is made of the fact of penetration. Typically the movement of sensing pins through holes in the punched ticket or card activates mechanical or electromechanical linkage to initiate a further operation, such as an arithmetical or other accounting operation.

The present invention involves the idea that when the product desired is a punched record which will contain some or all of the data of the original punched ticket or card, the data transferring mechanism can be greatly simplified as compared to typical reading mechanism and the mechanical or electro-mechanical linkage dispensed with. As will appear from this specification and its drawings, a single element can constitute at one of its ends a sensing pin and constitute at the other of its ends a punch. The original punched ticket or card, if not having a punched hole at the place engaged by the sensing pin, can then serve as an interposer to drive this element through (at its other end) the sheet material of the new record. On the other hand, if the sensing pin end penetrates a punched hole in the original ticket or card the interposer action does not take place with respect to that element, and the other end of this element does not punch.

When it is considered that it will often be desired to sense simultaneously a hundred or so different code positions on the original record, it will be seen that the elimination of need for linkages controlled by the many sensing elements represents a substantial simplification.

A need for such transfer of data from punched form on one record into punched form on a different record may typically arise when other data needs to be added to the original data before final use is made of the combined data. The invention is illustrated as embodied in mechanism which assembles data, namely data transferred as just described from original punched tickets or cards and further data which is to accompany the transferred data. The whole may be finally read by generally conventional reading equipment.

The transfer of the data by means of this invention involves a change in the code in which the data appears, in that the transferred data appears in the complement of the code in which the data appeared in the original record. This may be seen from the fact that "hole" in any given position of the transferred data punching means "no hole" in the same position of the original data punching, and "no hole" similarly means "hole." This creates no difficulty because the complement can afford as many usable combinations of code positions as the original. By using a reader arranged to distinguish between the ten different combinations of three positions out of five, the original data may be punched in the tickets or cards in a code which uses the ten combinations of two positions out of five. If it is desired that the reader shall be one that is set up to distinguish between the ten combinations of two positions out of five, the original data may be punched in the tickets or cards in a code which uses the ten combinations of three positions out of five. In either case the data added to the transferred data can be applied in the same code in which the transferred data appears and is to be read.

Figure 1:
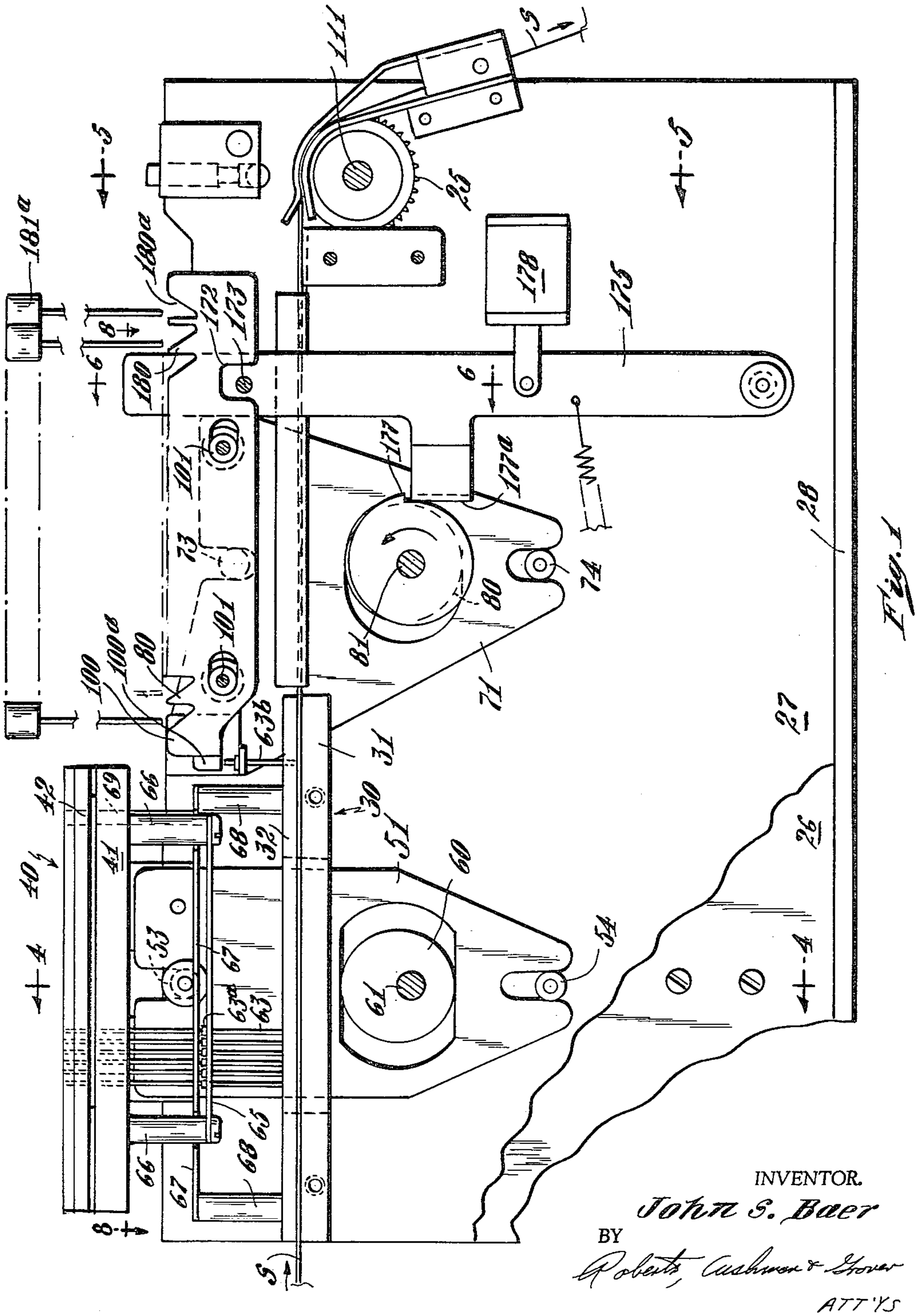
FIG. 1 is a front elevation with portions of the machine omitted and with most of the front plate of the frame of the machine broken away.

The machine operates to punch information in a strip S of tape, showing as entering the machine at the left and leaving the machine at the right in FIG. 1, the strip being driven by a feed sprocket 25, step by step, as later described.

A stationary frame includes front and back frame plates 26 and 27, a bottom plate 28 and other suitable cross-connections between the front and back plates.

Punching mechanism for the tape includes a lower tape die indicated generally at 30 which includes a lower die plate 31 extending between and fixed to the front and back plates and an upper die plate 32 spaced above and in fixed relation to the lower die plate.

Figure 4:
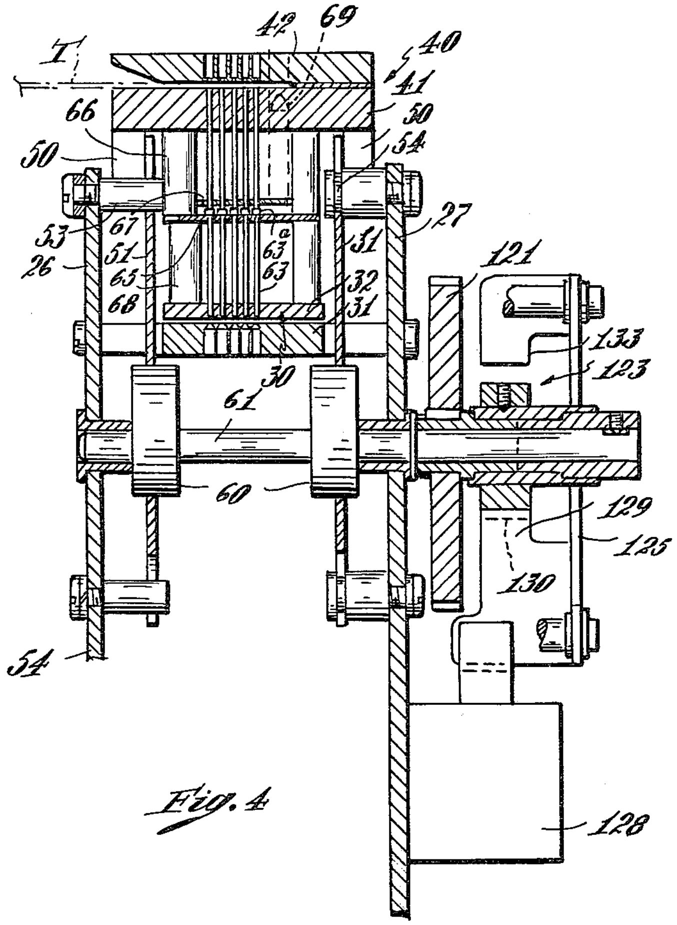
FIG. 4 is a vertical sectional view taken on a line 4—4 of FIG. 1 or FIG. 2.

For receiving a ticket T from which information is to be transferred to the tape, there is provided an upper vertically movable die 40 comprising upper and lower die plates 41 and 42, and having a flaring mouth (FIG. 4) through which a ticket may be inserted.

The lower die plate 41 of the ticket die 40 is secured through blocks 50 (FIG. 4) to vertically movable cam follower plates 51 which are guided by guide pins 53, 54 and receive an up and down motion from cams 60 driven by a shaft 61.

A bank of, for example, one hundred twenty-five punch pins 63, five for each of twenty-five columns of the punch field of a ticket, extend into the ticket die 40 from beneath and extend into the tape die 30 from above. A movable stripper plate 65, carried by posts, 66 (FIG. 1), extending down from the movable ticket die, is adapted to support each punch pin 63 through a collar *63a* carried near the mid-portion of the pin. In the inactive raised position of the movable ticket die of FIG. 4, the punch pins clear both the passage for tape through the tape die 30 and the passage for a ticket into and out of the ticket die 40.

A stationary stripper plate 67, supported by posts 68 (FIG. 1) from the tape die, lies above the collars *63a* (FIG. 4) of the punch pins and limits the upward movement of punch pins. Stripper plate 67 carries stationary locating pins, of which one is shown at 69 (FIG. 4), having tapered upper ends adapted to enter the locating holes of a ticket in the ticket die. Initial downward movement of the ticket die under the influence of cams 60 causes the locating pins to position the ticket accurately in the ticket die.

Further lowering of the ticket die 40 by action of the cams 60 will allow the lower end of the punch pins to encounter the tape in the tape die 30. Those punch pins whose upper ends then encounter punched holes in the ticket will extend through these holes, so that these punch pins will rest idly with their bottom ends on the tape. Those punch pins whose upper ends encounter solid ticket material, i.e., do not encounter previously punched holes in the ticket, will be forced down by the ticket material and will punch holes in the tape. This preferential punching of the tape rather than the ticket can be brought about by either or both of the circumstances that the tape is easier to punch through than is the ticket, and that the punch pins are somewhat sharp at their bottom ends but are blunt at their top ends.

In the latter part of a revolution of the cams 60 the ticket die is raised. Movable stripper plate 65 removes from the tape such punch pins as have penetrated the tape and stationary stripper plate 67 withdraws from the ticket any punch pins that have entered previously punched holes in the ticket.

As a result of this operation, thus far, the tape has been punched with the complement of the code with which the ticket was punched.

Figure 8:
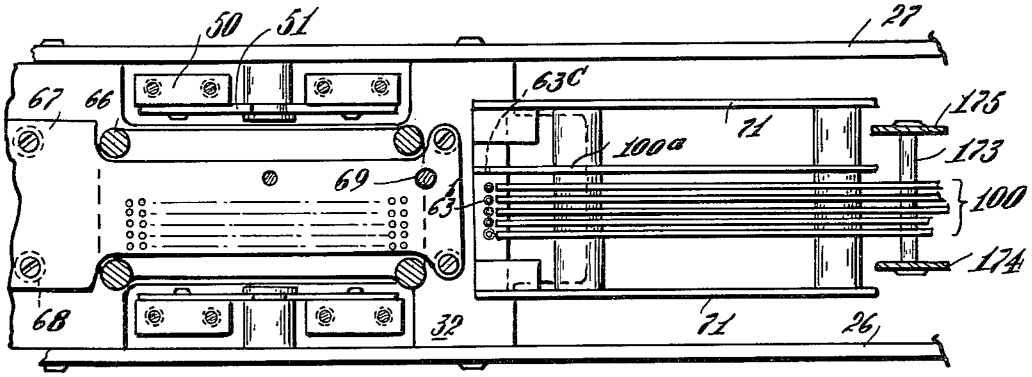
FIG. 8 is in the nature of a horizontal sectional view, mainly on the line 8—8 of FIG. 1, largely diagrammatic, showing certain structural elements and also diagrammatically showing relative locations of punch pins.

The tape die 30 in addition to having, for example, 25 columns, forming five rows, of punch pins 63 for transferring information from the ticket to the tape also has as indicated in FIG. 8, five additional punch pins 63*b* and one additional feed hole punch pin 63*c*.

A supplemental punching head includes a vertically movable assembly including cam follower plates 71 which are guided by guide pins 73, 74, FIG. 1, and receive an up and down movement from cams 80 mounted on a shaft 81.

For selectively controlling the punch pins 63*b*, the supplemental punching head assembly carries selectively actuable punch operating bars 100 slidable from right to left in FIG. 1 on guides 101 which extend between and interconnect the cam follower plates 71. In the retracted position of the bars 100 in FIG. 1 these bars 100 clear all of the punches 63*b*. Suitable controlling means for the bars 100, including clearing means, are provided as subsequently described.

A punch operating bar 100*a* is permanently positioned over the feed hole punch pin 63*c* and operates this punch once for each cycle of rotation of the cams 80.

Figure 3:
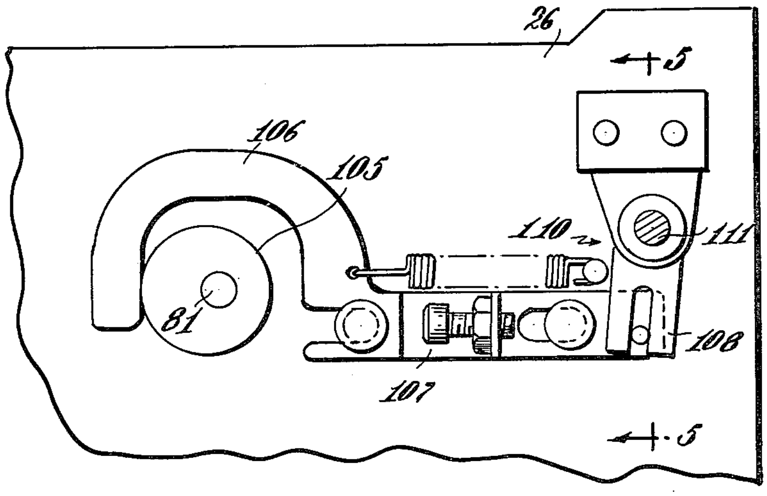
FIG. 3 is a front elevation of part of the machine, showing certain portions of the machine which are omitted in FIG. 1.
Figure 5:
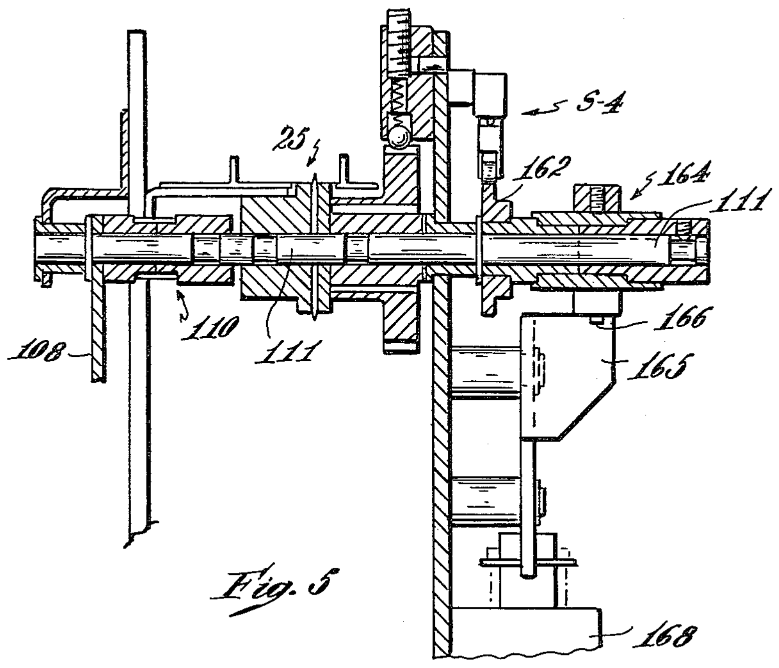
FIG. 5 is a vertical sectional view taken on a line 5—5 of any of FIGS. 1, 2 or 3.

Shaft 81 which operates the supplemental punching head carries a cam 105 (FIG. 3) which through a cam follower yoke 106, link 107 and crank 108, operates a ratchet clutch 110 (FIGS. 3 and 5) adapted to turn a shaft 11 which carries the toothed sprocket wheel 25. One revolution of the cam shaft 81 thus advances the sprocket and tape to the extent of the spacing of adjacent columns of punching. This represents 1/36 of a revolution of sprocket wheel 25.

One revolution of the cams 80 also punches a feed hole in the tape by means of the punch 63*c*.

A gear 120 (FIG. 2) continually driven by a motor, not shown, drives gears 121, 122 which are adapted to drive cam shafts 61 and 81 respectively through friction clutches 123 and 124, respectively.

Figure 2:
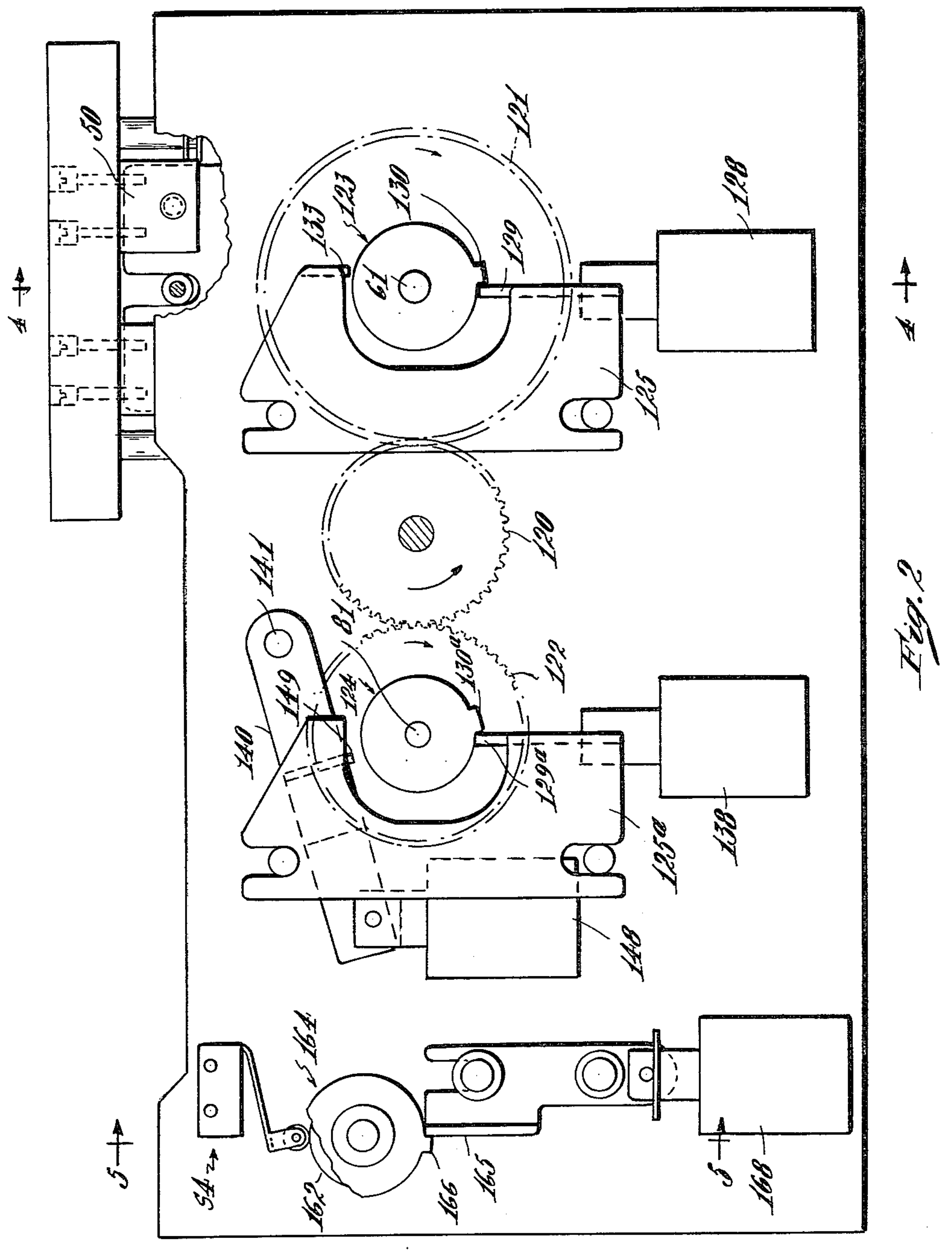
FIG. 2 is a rear view, with portions of the machine omitted.
Figure 9:
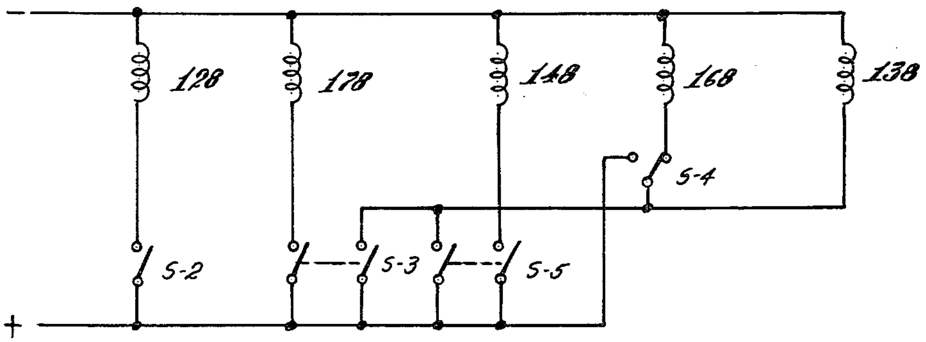
FIG. 9 is a simplified wiring diagram.

Clutch 123 is controlled by a vertically slidable actuator 125 adapted to be pulled down from its position of FIG. 2, against the action of a spring, not shown, by energization of a solenoid 128. A tang 129 on actuator 125 normally engages a stop 130 on the clutch assembly, thereby preventing rotation of shaft 61 while permitting gear 121 to continue rotating. A second tang 133 on actuator 125 alternatively engages the stop 130 at approximately one-half revolution of the clutch if the solenoid 128 remains energized; otherwise the shaft 61 completes its full revolution and the stop 130 is again engaged by the tang 129. Solenoid 128, as shown by the wiring diagram of FIG. 9, is controlled by a switch S–2 (which may be referred to as the "read switch"), preferably a key controlled switch.

Clutch 124 for shaft 81 is similarly controlled except that provision is made both for restricting the clutch to one revolution and stopping it, and also for causing a plurality of successive revolutions, more specifically, thirty-six. The clutch actuator 125*a* for the clutch 124, pulled down by solenoid 138 against the action of a spring, not shown, has only a single tang 129*a* and none corresponding to the upper tang 133 of the actuator 125. Thus, so far as the actuator 125*a* is concerned, the shaft 81 will continue to be driven so long as the solenoid 138 is energized.

A lever 140 pivoted at 141 can be swung down against the action of a spring (not shown) by energization of a solenoid 148 and carries with it a tang 149 adapted to engage the stop 130*a* at about one-half revolution. Solenoid 138 and solenoid 148 can be energized in parallel by a switch S–5 (which may be referred to as the "variable data punch switch"). When energized in this way both must be de-energized before the shaft 81 can complete a full revolution, whereupon this shaft is stopped by the action of the tang 129*a*.

When solenoid 138 is energized by closure of a switch S–3 (which may be referred to as the "advance switch") solenoid 148 is not energized and shaft 81 is not stopped at the approximately one-half revolution point pending de-energization of the solenoid 138. A step of rotation of the sprocket wheel shaft 111 by the ratchet clutch 110 takes place during the latter part of the cycle of a revolution of the shaft 81. Each such step of rotation of the shaft 111 tends to rotate a switch-controlling disc cam 162 (FIG. 5) through a friction clutch 164. Such rotation of the cam 162 is normally prevented by a vertically movable detent 165 which engages a stop 166 on the clutch. Detent 165 is normally held in its stopping position by a spring, not shown, but is removed from the stop 166 by energization of a solenoid 168. Switch S–4, controlled by the cam 162, is normally in a position to establish a circuit through solenoid 168 but movement of the cam 162 off its home position holds the switch S–4 in its alternate position in which the switch establishes a holding circuit for solenoids 138. This holding circuit only opens at the end of a revolution of the sprocket wheel 25 and cam 162, which corresponds to an advance of thirty-six columns on the tape. Thus, closure of the switch S–5 will result in one cycle of operation of the supplemental punching head and one column of advance of the tape, and closure of the advance switch S–3 will result in thirty-six cycles of operation of the supplemental punching head and thirty-six columns of advance. In either case, a feed hole will be punched for each column of advance by punch 63*c* which is forced through the tape each time the supplemental punching head is operated.

The selectively actuatable punch operating bars 100 of the supplemental punching head are notched at 172 on their undersides to receive a restoring bail 173 carried by pivoted arms 174 and 175. Near the end of a cycle in which data has been punched in the tape by the supplemental punching head, bail 173 is swung to the right in FIG. 1 by cam 177 on shaft 81 acting on a projection 177*a* from the arms 174 and 175, thus resetting or clearing the punch operating bars 100. A solenoid 178 is also adapted to act upon the bail 173 to hold the bars 100 in the inactive position throughout the thirty-six cycle advance of the tape initiated by the advance switch S–3. Solenoid 178 as shown by the wiring diagram is energized in parallel with solenoid 138 by the advance switch S–3, but not by the variable data punch switch S–5.

Assuming that information has been transferred from the ticket to the tape in the complement of the original code, and the tape has been advanced thirty-six columns by depressing the kep that closes advance switch S–3, any desired amount of variable data can then be punched in the tape, column by column, by the supplemental punching head.

Figure 6:
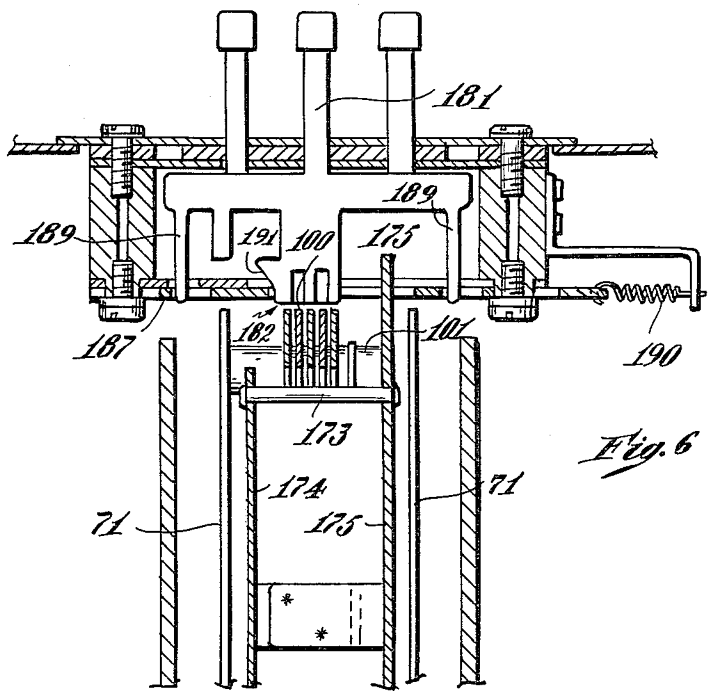
FIG. 6 is a vertical sectional view taken on the line 6—6 of FIG. 1.

The five punch operating bars 100, which are identical, are provided with inclined ramps 180 (FIG. 1) adapted to be engaged by keys 181 which are notched at their bottoms in the region 182 to operate various combinations of the bars, FIG. 6 showing a possible notching whereby the key nearest to the observer is notched so that it can operate the first, third and fifth bars 100 but not the second and fourth. Such operation moves the selected bars to the left in FIG. 1 so that their left ends lie over the corresponding punches **63*a***.

The keys are preferably spring-pressed in known manner to a restored upper position, but a depressed key will be held latched down by a slidable latch plate 187 (FIG. 6) which is recessed to receive depending legs 189 of the key and is normally urged to latched position by a spring 190. A cam surface 191 on each key is adapted to move the latch plate to releasing position so that it will release all other keys. One key **181*a* which is at the right of the bank of keys, FIG. 1, is a re-set or clear key adapted not only to cause the latch plate to release all other keys but also having a completely unnotched lower edge where other keys are notched. This unnotched portion will engage a reversely inclined ramp 180*a* of any active bar 100**, to shift this to the right to inactive position.

Figure 7:
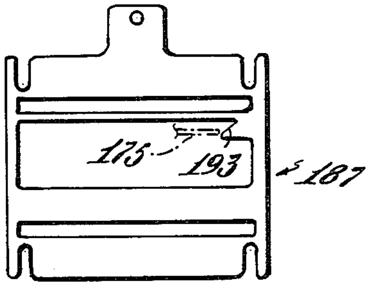
FIG. 7 is a plan of the key latch plate.

The latch plate 187 is also moved to releasing position preparatory to the automatic movement of bars 100 to inactive position by the bail 173. For this purpose the arm 175 extends up through the latch plate in position to engage an inclined surface 193, FIG. 7, to move the latch plate in the same direction as it is moved by the inclined surface 191 of a key, i.e., to the left in FIG. 6, downwardly of the figure of drawing FIG. 7.

It will be understood that it is preferable that the keyboard shall include ten digit keys and that these be coded to punch in the same code as the code in which the information transferred from ticket to tape appears in the tape, i.e., the complement of the original code in which information appears on the ticket. Preferably both of these codes are five position codes and the original code employs punches in two positions for representing a given digit and the other complemental code employs punches in the other three positions for representing that same digit.

In addition to the digit keys one or more "function" keys may control one or more of the bars of the supplemental punching head to make punchings additional to the digit-indicating punchings.

In the punched tape the data transferred from the ticket and the variable data added by the supplemental punching head can be readily distinguished visually by the fact that a blank space of one certain length will separate transferred data from succeeding variable data, and a blank space of a different length will separate variable data from succeeding transferred data.

Various electric circuits can be employed, a simplified circuit being shown in FIG. 9. In FIG. 9 the connections to the driving motor and various indicating lamps are omitted and only those for the solenoids 128, 138, 148, 168, and 178 shown. It will be understood that this part of the circuit will be operated by rectified current.

The "read" solenoid 128 is operated simply by closure of switch S–2, and as previously indicated, the two-tanged actuator 125 limits the cam shaft 61 to one revolution per closure of the switch S–2.

The solenoid 138 which initiates operation of the cam shaft 81 can be actuated either by closure of switch S–3 (for an advance cycle) or by closure of switch S–5 (for a variable data punch cycle).

For the advance cycle, closure of switch S–3 not only starts the cam shaft 81 through solenoid 138 but also operates the solenoid 168 to condition the machine for thirty-six cycles of operation of the supplemental punching head and tape feed by allowing friction clutch 164 to operate. Simultaneously closure of the switch S–3 energizes the solenoid 178 to restore the bars 100 to clear or non-punching position. Rotation of the feed sprocket shaft 111, friction clutch 164 and cam 162 then operate switch S–4 which establishes a holding circuit for solenoid 138 and de-energizes solenoid 168. At the end of one revolution of the cam 162, switch S–4 will return to its normal position shown in FIG. 9 and the advance cycle will be at an end.

For the data-punch cycle brought about by closing switch S–5, solenoid 178 is not operated by solenoids 138 and 148 are operated in parallel in unison. Energization of solenoid 138 causes the cycle to start and de-energization of solenoid 148 permits the cycle to continue past the half-revolution position of cam shaft 81, whereupon tang **129*a* of actuator 125*a* (now restored) will stop the cycle at the end of a revolution of shaft 81**.

I claim:

1. Mechanism for assembling information in punched hole form comprising reading means and punching means controlled thereby for transferring the information contained in a plurality of columns of punching on a ticket to corresponding columns of punching on a tape, manually settable punching means, including punch selector mechanism, for applying further columns of punching to the tape, tape feeding means adapted to advance the tape for each column of punching applied by the manually settable punching means, and means for operating the tape feeding means through a plurality of successive cycles for carrying the transferred-information columns of punching past the region of action of the manually settable punching means.

2. Mechanism for assembling information in punched hole form comprising reading means and punching means controlled thereby for transferring the information contained in a plurality of columns of punching on a ticket to corresponding columns of punching on a tape, manually settable punching means, including punch selector mechanism, for applying further columns of punching to the tape, tape feeding means operable automatically through a single cycle and as a consequence of an operation of the manually settable punching means for advancing the tape to a position to receive the next column of punching by said manually settable punching means, and means for operating the tape feeding means through a plurality of successive cycles for carrying the transferred-information columns of punching past the region of action of the manually settable punching means.

3. Mechanism for assembling information in punched hole form comprising reading means and punching means controlled thereby for transferring the information contained in a plurality of columns of punching on a ticket to corresponding columns of punching on a tape, supplemental punching mechanism including selectively settable punch controlling means, for applying further columns of punching to the tape, tape feeding means operable in conjunction with the supplemental punching mechanism to advance the tape following each operation of the supplemental punching mechanism, means for operating the tape feeding means through a plurality of successive cycles for carrying the transferred-information columns of punching past the region of action of the supplemental punching mechanism, and means controlled by actuation of said last-named means for automatically clearing the selectively settable punch controlling means to prevent supplemental punching.

4. Mechanism for assembling information in punched hole form comprising reading means and punching means controlled thereby for transferring the information contained in a plurality of columns of punching on a ticket to corresponding columns of punching on a tape, supplemental punching mechanism including selectively settable punch controlling means, for applying further columns of punchings to the tape, tape feeding means operable in conjunction with the supplemental punching mechanism to advance the tape following each operation of the supplemental punching mechanism, two alternatively operable manual means for initiating operation of the supplemental punching mechanism and tape feeding means, means associated with one of said manual means for limiting the operation of the supplemental punching mechanism and tape feeding means to a single cycle per manual initiation of their operation, and means associated with the other of said manual means for holding the supplemental punching mechanism and tape feeding means operative during a plurality of cycles per manual initiation of their operation.

5. Mechanism for assembling information in punched hole form comprising reading means and punching means controlled thereby for transferring the information contained in a plurality of columns of punching on a ticket to corresponding columns of punching on a tape, manually settable punching means, including punch selector mechanism, for applying further columns of punching to the tape, a tape feed hole punch, means cooperating with feed holes punched in the tape for advancing the tape, means for initiating single cycles of operation of the feed hole punch, the tape advancing means and the manually settable punching means, and means for instituting a predetermined plurality of successive cycles of operation of the feed hole punch and tape advancing means while suppressing punching by the manually settable punching means.

References Cited in the file of this patent

UNITED STATES PATENTS

| | | |
|---|---|---|
| 739,399 | Day | Sept. 22, 1903 |
| 3,033,444 | Quinn et al. | May 8, 1962 |

FOREIGN PATENTS

| | | |
|---|---|---|
| 509,561 | Italy | Jan. 15, 1955 |